J. H. MURRILL.
MACHINE FOR CRACKING SUGAR.
No. 24,910.                              PATENTED JULY 26, 1859.
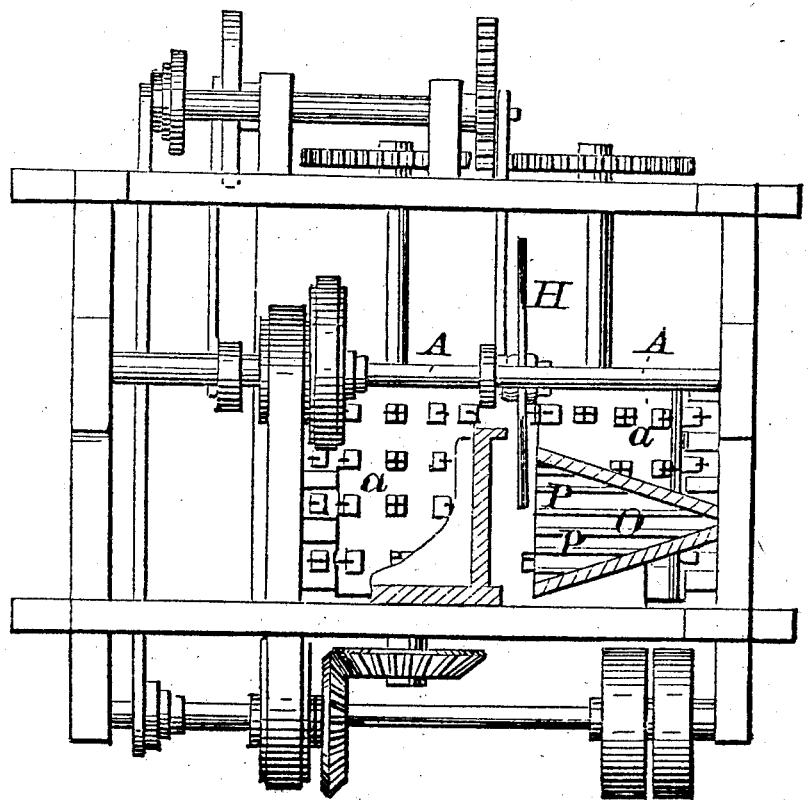
*TAKEN FROM PATENT OFFICE REPORT*
*1859 VOL. II*
*ONLY DRAWING ACCESSIBLE (1912)*

UNITED STATES PATENT OFFICE.

JAMES H. MURRILL, OF BALTIMORE, MARYLAND, ASSIGNOR TO EGERTON, DOUGHERTY, WORDS & CO., OF SAME PLACE.

MACHINE FOR CRACKING SUGAR.

Specification of Letters Patent No. 24,910, dated July 26, 1859.

*To all whom it may concern:*

Be it known that I, JAS. H. MURRILL, of the city of Baltimore and State of Maryland, have invented certain new and useful Improvements in Sugar-Cracking Machines; and I do hereby declare that the following is a full, clear, and exact description of the same, reference being had to the accompanying drawings, making a part of this specification, in which—

Figure 1 is a plan and top view; Fig. 2, a side elevation; Fig. 3, an end elevation; Fig. 4, a section of the rolls; Fig. 5, one of the teeth on the rolls.

The character of my improvements are such, that by the employment of a reciprocating circular saw, slabs may be removed from masses of sugar of any desired thickness which on being dropped between revolving rollers armed with peculiar shaped teeth, said slabs shall be split or cracked into cubes of great regularity of size and without the production of an undue quantity of powdered or granulated article, in a manner more perfect than has heretofore been effected by mechanical means.

My invention consists first in such an arrangement of the reciprocating saw, and of the cracking rollers and clearing rakes, that all handling of the sugar after it is placed in the hopper is dispensed with; secondly, from the cruciform figure of the edges of the teeth on the rollers, the fracture is not only more regular, but the abrasion of the crystals is greatly reduced, over any known method; this result arising from the splitting of the slab of sugar by the mere contact of the antagonistic corners of the teeth, thus giving a direction to the fracture; thirdly in constructing the hopper with its surface provided either with parallel grooves or ribs, for the purpose of allowing the cone of sugar to slide toward the gage while at the same time it is prevented from rotation under the action of the saw.

To enable others skilled in the art to construct and use my inventions I would describe them as follows:

A A are a pair of rollers mounted on shafts B B lying parallel with each other. C C are cog wheels of similar size, on the ends of said shafts, gearing into each other.

D is a bevel wheel on one of the shafts and D′ is a bevel pinion (meshing with D) mounted on the main driving shaft E.

The rollers are armed with metal teeth one of which is shown in Fig. 5. The cutting edge of these teeth is that of a cross, and they are placed around the rollers at such a distance apart, as it may be desirable to have the particle or lump of sugar; for instance if half inch lumps are required, the teeth will be half an inch apart in both directions. The gearing wheels C C insure the presentation of the teeth directly opposite each other in the movement of the rollers.

F, F, are metallic plates or rakes secured to the cross framing and occupy the space between each row of teeth, their ends being in close contact with the surface of the rollers, for the purpose of clearing them of any adhering sugar.

G, is a shaft extending from one side of the framing to the other at right angles to the shafts of the rollers; it is placed sufficiently high to allow of the suspension of the saw frame ($b$ $b$) therefrom, and carries the pulleys 1 and 2.

H is a circular saw mounted on shaft parallel with G carrying a pulley 5 for driving the saw by a belt from pulley 1, while pulley 1 is driven by a belt from pulley 6 placed on the main driving shaft E passing over pulley 2.

The reciprocation of the saw is effected by pulley 7 on shaft E and a belt passing over pulley 8. The shaft I of the latter pulley is secured in bearings at the rear of the frame. On the end of shaft I is a pinion K, which meshes with a cog wheel L, placed on a shaft below I. The shaft of L also carries a blank wheel M, which serves as a balance. From the faces of L and M project crank pins from which extend pitman rods N, N, to the saw frame $b$ $b$.

As it may be desirable to give different degrees of feed to the saw, the frame thereof may be made to vibrate slower or faster by shifting the band passing over pulleys 7 and 8, those pulleys being formed of a series of disconnecting pulleys for that purpose.

The hopper O is a triangular shaped trough secured to one of the side girts of the frame. It has its inner surface formed with grooves parallel to the line of juncture of its sides (as shown in Fig. 1). The hopper is placed at right angles to the path of the vibrating saw, and its front edge very slightly in the rear of the cut of the saw.

At a desired distance from the front edge of the hopper is placed the gage plate P, against which the butt of the loaf of sugar slides on the withdrawal of the saw. The face of the gage plate extends downward and with the apron of the hopper forms a narrow box for guiding the slab of sugar between the cracking rollers.

In an operative machine a provision is made for the production of different thicknesses in the slabs of sugar, by having sliding boxes to one of the rollers and a set screw and bolt to fasten the gage plate at different distances from the edge of the hopper.

Having described my improvement, what I claim as my invention, and desire to secure by Letters Patent, is—

1. The employment of a vibratory saw H when constructed and operated in the manner described in combination with a gage plate P, and hopper O, arranged substantially in the manner and for the purposes of sawing off slabs of sugar and directing them between crushing rollers.

2. I claim the employment of rollers A A moving in unison with each other when constructed with cruciform cutters $a$ $a$ as described for the purpose of perfectly dividing slabs of sugar into regular cubic portions substantially as set forth.

3. I claim the construction of a hopper O when provided with parallel grooves, or their equivalent, when used in combination with a circular saw, constructed and operated in the manner and for the purposes as set forth.

In testimony I have signed my name before two witnesses.

JAMES H. MURRILL.

Witnesses:
EDW. F. BROWN,
GEO. STABLER.